UNITED STATES PATENT OFFICE 1,994,116

METALLIFEROUS DYESTUFFS AND PROCESS OF MAKING SAME

Fritz Straub and Hans Mayer, Basel, Switzerland, assignors to "Society of Chemical Industry in Basle," Basel, Switzerland No Drawing. Application June 7, 1933, Serial No. 674,776. In Switzerland July 22, 1932

8 Claims. (Cl. 260—12)

The present invention relates to metalliferous dyestuffs. It comprises the process of making same, as well as the new dyestuffs themselves.

According to the present invention non-sulfonated metalliferous dyestuffs can be made in a very advantageous manner by treating non-sulfonated dyestuffs containing groups capable of forming lakes, with agents yielding metal, in an alkaline medium and in the presence of aliphatic hydroxy-carboxylic acids.

This novel metallizing process makes it possible on the one hand to convert such non-sulfonated dyestuffs containing lake-forming groups which cannot be metallized by any known process into their complex metal compounds, and on the other hand, in most cases, to obtain complex metal compounds which have much more favorable dyeing qualities, for instance in respect of purity of tint and fastness, than have been obtained by the known processes.

Aliphatic hydroxycarboxylic acids or their salts suitable for the process of this invention are, for example, lactic acids, tartaric acids, glycolic acid, tartronic acid, malic acid dihydroxytartaric acid, citric acid, saccharic acid, gluconic acid and heptonic acid, or the sodium, potassium and ammonium salts of these.

The invention is applicable to all dyestuffs containing lake-forming groups; for instance non-sulfonated mono- and polyazo-dyestuffs, which contain in ortho-position to at least one azo-bridge at least one substituted or non-substituted hydroxyl-group or at least one carboxyl-group or at least one ortho-hydroxy-carboxyl-group, such as is characteristic of the salicylic acid derivatives; also the invention is applicable to non-sulfonated hydroxyanthraquinones, as well as to non-sulfonated dyestuffs of the triarylmethane series, the azine series and the oxazine series, so far as they contain lake-forming groups.

The metallization in presence of aliphatic hydroxycarboxylic acids or their salts is suitable for making mono- or poly-metal compounds, for example compounds of chromium, copper, iron, cobalt, nickel, manganese, zinc, vanadium or titanium, with non-sulfonated dyestuffs containing lake-forming groups; moreover, there may be added in the metallizing process besides the aliphatic hydroxycarboxylic acid or its salt other suitable substances, for example common salt, Glauber's salt or sodium acetate. The operation may be conducted either in an open vessel or under pressure and in certain cases may be combined with the production of the parent dyestuff, for instance it may be carried out in the dyebath.

The metalliferous dyestuffs obtainable by this invention are suitable, in particular, for coloring varnishes and plastic masses which consist of a basis of cellulose or a natural or artificial resin. Such bodies are, for example, cellulose lacquers, condensation products of aldehyde with aromatic amines, for instance aniline or acid amides, such as urea or thiourea, or derivatives of these, di-cyandiamide-aldehyde condensation products, phenol-aldehyde condensation products, condensation products of polybasic acids with polyhydric alcohols; finally, polymerization products such as vinyl resins, styrene resins or the like. They dye these varnishes and plastic masses yellow to brown to red to violet to blue to green to black shades.

The following examples illustrate the invention, the parts being by weight:—

*Example 1*

6.18 parts of the dyestuff of the formula

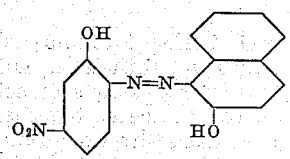

from diazotized 5-nitro-2-amino-1-phenol and β-naphthol are suspended in 400 parts of water and 2.7 parts of caustic soda solution of 30 per cent. strength. To the suspension, at 70° C., is added a feebly alkaline solution of 5.9 parts of chromic sulfate, 9 parts of tartaric acid, 40 parts of water and 29.2 parts of caustic soda solution of 30 per cent. strength. After boiling for 12 hours the chroming is complete. After cooling, the mass is neutralized with dilute acetic acid and filtered from the precipitated dyestuff, which is washed and dried at a moderate temperature. There is obtained a dark blue powder, which is slightly soluble in water but freely soluble in organic solvents to reddish-blue solutions. From a solution of the dyestuff in cellulose lacquer there may be obtained on suitable surfaces blue-grey to blue-black coatings.

By introducing into the same diazo-dyestuff instead of chromium, chromium and cobalt or iron and cobalt, aluminium and copper in analogous manner violet or violet brown or even violet dyeing dyestuffs are obtained.

If the dyestuff from diazotized 4-chloro-2-amino-1-phenol and β-naphthol is chromed in a similar manner or is treated for introduction of chromium and iron, there is obtained a dyestuff containing chromium or chromium and iron, which gives to cellulose lacquer on a suitable surface coatings which are respectively blue-violet or brown-violet and fast to light.

The dyestuff of the formula

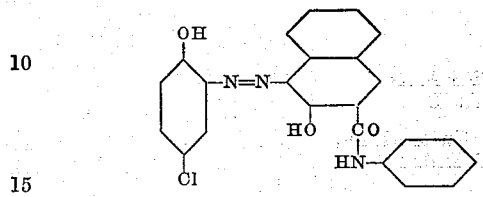

from diazotized 4-chloro-2-amino-1-phenol and 2,3-hydroxynaphthoic acid anilide yields, when chromed in presence of tartaric acid a chromiferous dyestuff which is a black-blue powder; this dissolves very sparingly in water but freely in organic solvents to a blue-violet solution. A solution of this dyestuff in a nitrocellulose lacquer or an acetylcellulose lacquer coated on a suitable support, for instance metal sheet, yields coatings which are blue-violet.

Grey blue coatings are obtained by means of the chromiferous dyestuffs made in presence of tartaric acid from diazotized 5-nitro-2-amino-1-phenol and 2,3-hydroxynaphthoic acid anilide.

Example 2

8.26 parts of the dyestuff of the formula

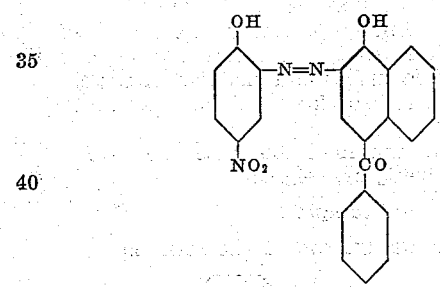

from diazotized 4-nitro-2-amino-1-phenol and 4-benzoyl-1-hydroxynaphthalene, 400 parts of water and 2.7 parts of caustic soda solution of 30 per cent. strength are heated together to boiling and the whole is mixed with a solution made from 5.9 parts of chromic sulfate, 9 parts of tartaric acid, 40 parts of water and 29.2 parts of caustic soda solution of 30 per cent. strength. After boiling the mixture for 12 hours the chroming is complete. The dyestuff has by then completely separated; it is filtered and washed until neutral. When dry it is a violet black powder which dissolves freely in organic solvents to a brownish-violet solution. In nitro-cellulose lacquer or acetyl-cellulose lacquer on a suitable support, it yields bluish Bordeaux tints.

Example 3

6.51 parts of the dyestuff of the formula

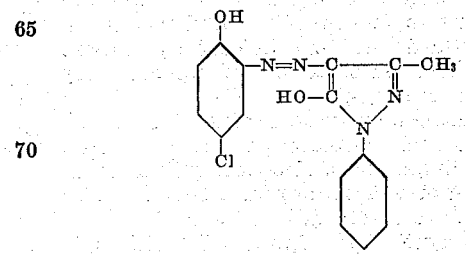

from diazotized 4-chloro-2-amino-1-phenol and 1-phenyl-3-methyl-5-pyrazolone, 400 parts of water and 2.7 parts of caustic soda solution of 30 per cent. strength are heated together to boiling and the whole is mixed with a solution of 5.9 parts of chromium sulfate, 9 parts of tartaric acid, 40 parts of water and 29.2 parts of caustic soda solution of 30 per cent. strength. After boiling the mixture for 10 hours it is neutralized with acetic acid and the dyestuff which has separated is filtered and washed. When dry it is a red powder which dissolves in organic solvents to a yellow red solution and yields scarlet red coatings fast to light when dissolved in the commercially usual nitrocellulose varnishes and applied on metal sheet.

Instead of the chromic sulfate an agent yielding nickel may be used in which case a dyestuff dyeing yellow orange is obtained.

Like results follow the use of other aliphatic hydroxycarboxylic acids or their salts instead of tartaric acid.

Example 4

6.72 parts of the dyestuff of the formula

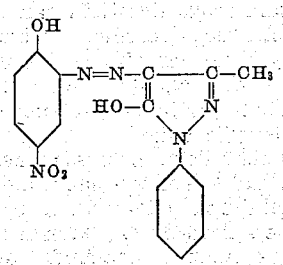

from diazotized 4-nitro-2-amino-1-phenol and 1-phenyl-3-methyl-5-pyrazolone, 400 parts of water and 2.7 parts of caustic soda solution of 30 per cent. strength are together heated to boiling and there is added a solution made by allowing 48 parts of a chromium fluoride solution containing 4.9 per cent. of $Cr_2O_3$, 9 parts of tartaric acid and 27 parts of caustic soda solution of 30 per cent. strength to react with each other. When the whole has been boiled for 12 hours chroming is complete; after cooling, the chromium compound is separated by neutralization with acetic acid and is filtered and washed. When dry, it is a yellow red powder, soluble in organic solvents to orange solutions and producing in cellulose lacquers, spread upon suitable supports, coatings which are yellow orange and fast to light.

Example 5

6.72 parts of the dyestuff of the formula

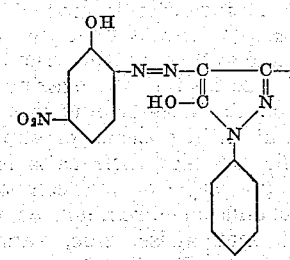

from diazotized 5-nitro-2-amino-1-phenol and 1-phenyl-3-methyl-5-pyrazolone, 500 parts of water and 2.7 parts of caustic soda solution of 30 per cent. strength are together heated to boiling and the mixture is mixed with a solution of 5.9 parts of chromic sulfate, 9 parts of tartaric acid, 40 parts of water and 29.2 parts of caustic soda solution of 30 per cent. strength. After the whole has been boiled for 10 hours it is neutralized with acetic acid and the dyestuff is filtered and washed. When dry it is a brown red powder, sparingly soluble in water, freely soluble in organic solvents to a bluish-red solution. The coatings which are obtained on suitable supports, such as metal sheets, by means of a solution of the dyestuff in nitrocellulose lacquer or acetyl-cellulose lacquer, are bluish red.

*Example 6*

6.30 parts of the dyestuff of the formula

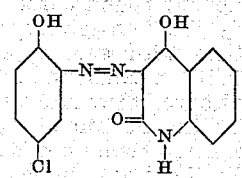

from diazotized 4-chloro-2-amino-1-phenol and 2,4-dihydroxyquinoline, 500 parts of water and 2.7 parts of caustic soda solution of 30 per cent. strength are together heated to boiling. There is then added a solution of 20 parts of a chromium hydroxide paste of 11.8 per cent. strength in 9 parts of tartaric acid, 20 parts of water and 24 parts of caustic soda solution of 30 per cent. strength; the whole is then boiled for 15 hours in a reflux apparatus. After neutralization with acetic acid, the dyestuff is filtered and washed. It is dried at a moderate temperature and is then a brown red powder, very sparingly soluble in water and freely soluble in organic solvents to a Bordeaux red solution. Nitrocellulose lacquer or acetylcellulose lacquer containing the dyestuff yields coatings of the same tint.

*Example 7*

15.4 parts of 5-nitro-2-amino-1-phenol are diazotized in the usual manner by means of 29 parts of hydrochloric acid of 30 per cent. strength and 6.9 parts of sodium nitrite and the product is coupled with a solution of 15 parts of 2-amino-naphthalene in 160 parts of water and 13.8 parts of hydrochloric acid at 40–45° C. When coupling is complete there are added to the reaction mixture containing the dyestuff of the formula

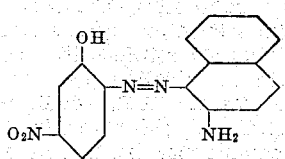

54 parts of caustic soda solution of 30 per cent. strength and a solution of 14.1 parts of crystallized cobalt sulfate ($CoSO_4.7H_2O$), 3.75 parts of tartaric acid, 150 parts of water and 27 parts of caustic soda solution of 30 per cent. strength. The whole is then heated for 1 to 2 hours at 70–75° C. and then mixed with dilute acetic acid until the reaction corresponds with that of a weak alkaline bicarbonate solution; the dyestuff, which is separated, is filtered and washed until neutral. When dry it is a blue-black powder freely soluble in organic solvents to a green-blue solution; coatings on suitable supports obtained with nitrocellulose lacquer or acetylcellulose lacquer containing the dyestuff are greenish-blue to blueblack.

Green-black coatings are obtained by using the cobaltiferous dyestuff made in similar manner from diazotized 4-nitro-2-amino-1-phenol and 2-amino-naphthalene.

*Example 8*

5.97 parts of the dyestuff of the formula

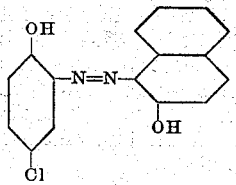

from diazotized 4-chloro-2-amino-1-phenol and β-naphthol, 500 parts of water and 2.7 parts of caustic soda solution of 30 per cent. strength are heated together to boiling. There are then added the green solution obtained by mixing 4.8 parts of chromic sulfate, 1.2 part of crystallized cobalt sulfate, 6 parts of tartaric acid, 30 parts of water and 19 parts of caustic soda solution of 30 per cent. strength. The whole is then boiled for 14 hours in a reflux apparatus. After cooling, neutralization with acetic acid, filtration and washing follow. The dry dyestuff is a dark blue powder, soluble in organic solvents to violet solutions and yielding in nitrocellulose lacquers or acetylcellulose lacquers coatings of the same tint.

Violet to violet black coatings are obtained by using the cobaltiferous dyestuff produced in presence of tartaric acid from diazotized 4-chloro-2-amino-1-phenol and 2-amino-naphthalene.

*Example 9*

6.30 parts of the dyestuff of the formula

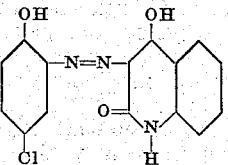

from diazotized 4-chloro-2-amino-1-phenol and 2,4-dihydroxyquinoline, 500 parts of water and 2.7 parts of caustic soda solution of 30 per cent. strength are together heated to boiling. There is then added a solution of 5.9 parts of chromic sulfate, 15 parts of potassium saccharate ($C_6H_9O_8K$) 60 parts of water and 24 parts of caustic soda solution of 30 per cent. strength and the whole is boiled for 15 hours in a reflux apparatus. After neutralization with acetic acid the dyestuff which has separated is filtered and washed. It is dried at a moderate temperature, whereupon it becomes a brown red powder, very sparingly soluble in water but freely soluble in organic solvents to Bordeaux red solutions. Nitrocellulose lacquers or acetyl-cellulose lacquers containing it yield brown red coatings.

*Example 10*

5.50 parts of the dyestuff of the formula

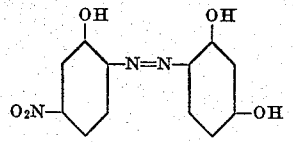

from diazotized 5-nitro-2-amino-1-phenol and resorcinol are dissolved in 200 parts of water and 2.7 parts of caustic soda solution of 30 per cent. strength. A solution of 1.61 parts of ferric chloride in 20 parts of water, to which has been added 3.6 parts of lactic acid and 16 parts of caustic soda solution of 30 per cent.

strength, is added and the whole is heated to boiling for 1 hour. After cooling, the iron compound of the dyestff, which has been formed, is precipitated by neutralization with acetic acid, filtered and washed. When dry it is a green black powder soluble in organic solvents to a blackish brown solution. Nitrocellulose lacquer or acetylcellulose lacquer containing it yields on sheets of tin or aluminium blackish brown coatings.

*Example 11*

6.72 parts of the dyestuff of the formula

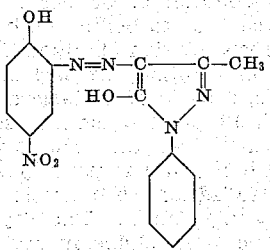

from diazotized 4-nitro-2-amino-1-phenol and 1-phenyl-3-methyl-5-pyrazolone are suspended in 400 parts of water and 2.7 parts of caustic soda solution of 30 per cent. strength and, after addition of a solution of 4.6 parts of crystallized manganese sulfate, 30 parts of water, 3.5 parts of citric acid and 20 parts of caustic soda solution of 30 per cent. strength, the whole is boiled for a short time in a reflux apparatus. After cooling, the dyestuff is precipitated by neutralization with acetic acid and is filtered and dried. There is thus obtained a yellow red powder, soluble in alcohol to an orange solution; a solution of it in cellulose lacquer on suitable supports yields yellow orange coatings.

Instead of the caustic soda solution indicated in the examples there may also be used other bases, such as, for example, caustic potash solution, ammonia, soda, potash or borax.

*Example 12*

4-5 parts of the metalliferous dyestuff produced in accordance with this invention are dissolved in 1000 parts of a finished cellulose varnish. When the liquid thus colored is spread in a thin layer on various supports (metal, glass, leather, earthenware, wood, celluloid, silk or the like) there is left on drying a transparent coating. By incorporating suitable additions the transparent varnish can be converted into a matt- or covering-varnish.

What we claim is:—

1. Process for the manufacture of dyestuffs containing complexly bound metal, consisting in treating the non-sulfonated azo-dyestuffs containing groups capable of forming lakes with agents yielding metal, in an alkaline medium and in the presence of aliphatic hydroxycarboxylic acids.

2. Process for the manufacture of dyestuffs containing complexly bound metal, consisting in treating the non-sulfonated ortho-hydroxyazo-dyestuffs with agents yielding metal, in an alkaline medium and in the presence of aliphatic hydroxycarboxylic acids.

3. Process for the manufacture of dyestuffs containing complexly bound chromium, consisting in treating the non-sulfonated ortho-hydroxyazo-dyestuffs with agents yielding chromium, in an alkaline medium and in the presence of aliphatic hydroxycarboxylic acids.

4. Process for the manufacture of dyestuffs containing complexly bound chromium, consisting in treating the non-sulfonated ortho-hydroxyazo-dyestuffs with agents yielding chromium, in an alkaline medium and in the presence of tartaric acid.

5. Dyestuffs containing complexly bound metal obtained by treating the non-sulfonated azo-dyestuffs containing groups capable of forming lakes with agents yielding metal, in an alkaline medium and in the presence of aliphatic hydroxycarboxylic acids, which products are sparingly soluble in water and freely soluble in the usual commercial pyroxyline varnishes to differently colored solutions.

6. Dyestuffs containing complexly bound metal obtained by treating the non-sulfonated ortho-hydroxyazo-dyestuffs with agents yielding metal, in an alkaline medium and in the presence of aliphatic hydroxycarboxylic acids, which products are sparingly soluble in water and freely soluble in the usual commercial pyroxyline varnishes to differently colored solutions.

7. Dyestuffs containing complexly bound chromium obtained by treating the non-sulfonated ortho-hydroxyazo-dyestuffs with agents yielding chromium, in an alkaline medium and in the presence of aliphatic hydroxycarboxylic acids, which products are sparingly soluble in water and freely soluble in the usual commercial pyroxyline varnishes to differently colored solutions.

8. Dyestuffs containing complexly bound chromium obtained by treating the non-sulfonated ortho-hydroxyazo-dyestuffs with agents yielding chromium, in an alkaline medium and in the presence of tartaric acid, which products are sparingly soluble in water and freely soluble in the usual commercial pyroxyline varnishes to differently colored solutions.

FRITZ STRAUB.
HANS MAYER.